US012705232B2

(12) United States Patent
Long

(10) Patent No.: US 12,705,232 B2
(45) **Date of Patent: *Aug. 11, 2026**

(54) SYSTEMS AND METHODS FOR MANAGING OFFLINE DATABASE ACCESS

(71) Applicant: MASTERCARD INTERNATIONAL INCORPORATED, Purchase, NY (US)

(72) Inventor: Kenneth L. Long, O'Fallon, MO (US)

(73) Assignee: Master Card International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,918

(22) Filed: Sep. 15, 2023

(65) Prior Publication Data

US 2024/0004875 A1 Jan. 4, 2024

Related U.S. Application Data

(63) Continuation of application No. 14/074,245, filed on Nov. 7, 2013, now Pat. No. 11,762,849.

(60) Provisional application No. 61/752,190, filed on Jan. 14, 2013.

(51) Int. Cl.

*G06F 16/24* (2019.01)
*G06F 16/23* (2019.01)
*G06F 16/242* (2019.01)
*G06F 21/62* (2013.01)

(52) U.S. Cl.

CPC ...... *G06F 16/2445* (2019.01); *G06F 16/2379* (2019.01); *G06F 21/6227* (2013.01)

(58) Field of Classification Search

CPC ......................... G06F 16/2445; G06F 16/2379

See application file for complete search history.

(56) References Cited

U.S. PATENT DOCUMENTS

| | | | |
|---|---|---|---|
| 6,292,800 | B1 | 9/2001 | Eldreth |
| 6,856,970 | B1 | 2/2005 | Campbell et al. |
| 6,915,305 | B2 | 7/2005 | Subramanian et al. |
| 7,065,527 | B2 | 6/2006 | McCartney et al. |
| 7,440,963 | B1 | 10/2008 | Bello et al. |
| 7,882,087 | B2 | 2/2011 | Johnson |
| 8,280,907 | B2 | 10/2012 | Dettinger et al. |
| 9,626,379 | B1 | 4/2017 | Allen |
| 2003/0023607 | A1 | 1/2003 | Phelan et al. |
| 2003/0137941 | A1 | 7/2003 | Kaushik et al. |
| 2004/0003003 | A1 | 1/2004 | McCartney et al. |
| 2005/0283465 | A1 | 12/2005 | Dettinger et al. |
| 2006/0004839 | A1 | 1/2006 | Nagasawa et al. |

(Continued)

*Primary Examiner* — Brittany N Allen

(74) *Attorney, Agent, or Firm* — Armstrong Teasdale LLP

(57) ABSTRACT

A computer-implemented method for managing access to data stored in a database is provided. The method includes storing in the database a switch parameter having a first value, storing in the database at least two instances of a data object wherein each of the instances includes a unique identifier, receiving a client query from a requestor, determining by the computing device an active instance from the at least two instances based at least in part on comparing the first value of the switch parameter to the unique identifier of each instance, modifying by the computing device the client query at least in part based on the determined active instance to create a resultant query, executing the resultant query against the active instance to generate a resultant data, and providing the resultant data to the requestor.

17 Claims, 6 Drawing Sheets

(56) References Cited

U.S. PATENT DOCUMENTS

| | | | |
|---|---|---|---|
| 2007/0124303 | A1 | 5/2007 | Dettinger et al. |
| 2009/0182636 | A1 | 7/2009 | Gilula |
| 2009/0276692 | A1 | 11/2009 | Rosner |
| 2010/0030826 | A1 | 2/2010 | Kohno et al. |
| 2010/0114868 | A1 | 5/2010 | Beavin et al. |
| 2011/0289307 | A1 | 11/2011 | Humprecht |
| 2012/0102364 | A1 | 4/2012 | Kemmler et al. |
| 2013/0238641 | A1 | 9/2013 | Mandelstein et al. |
| 2015/0254313 | A1 | 9/2015 | Perkowitz et al. |
| 2015/0347420 | A1 | 12/2015 | Glover et al. |

SYSTEMS AND METHODS FOR MANAGING OFFLINE DATABASE ACCESS

CROSS REFERENCE TO RELATED APPLICATIONS

This application is a continuation of and claims priority to U.S. patent application Ser. No. 14/074,245 filed on Nov. 7, 2013, entitled "SYSTEMS AND METHODS FOR MANAGING OFFLINE DATABASE ACCESS", which claims the benefit of U.S. Provisional Application No. 61/752,190 filed Jan. 14, 2013, the disclosures of which are hereby incorporated by reference in their entirety.

BACKGROUND

The field of the disclosure relates generally to data management, and more particularly to maintaining continuous access to database information during maintenance operations that would otherwise require taking the database offline.

Data may be stored in one or more databases. To retrieve and/or view data, a user may query a particular database to retrieve the desired data. Depending on the importance of the data and/or the number of queries, it may be desirable for the data to have high-availability (i.e., be accessible substantially all of the time).

However, in at least some known data management systems, to update and/or perform maintenance on data in a database, the database must be taken offline. While the database is offline, users are unable to access the data, resulting in periods of downtime when the data is inaccessible. Depending on the size of the database, updating and/or maintenance operations can take up to several hours. If users attempt to access the data during updating, data loading, and/or maintenance, an error message may be returned. In at least some applications, it is desirable that data be accessible essentially at all times, regardless of whether maintenance, data loading, and/or updating are being performed.

BRIEF DESCRIPTION OF THE DISCLOSURE

In one aspect, a computer-implemented method for managing access to data stored in a database is provided. The method is implemented using a computing device having a processor communicatively coupled to the database. The method includes storing in the database a switch parameter having a first value, storing in the database at least two instances of a data object wherein each of the instances including a unique identifier, receiving a client query from a requestor, determining by the computing device an active instance from the at least two instances based at least in part on comparing the first value of the switch parameter to the unique identifier of each instance, modifying by the computing device the client query at least in part based on the determined active instance to create a resultant query, executing the resultant query against the active instance to generate a resultant data, and providing the resultant data to the requestor.

In another aspect, a computing device for managing access to data stored in a database is provided. The computing device includes a processor communicatively coupled to the database. The processor is configured to store a switch parameter having a first value, store at least two instances of a data object wherein each of the instances including a unique identifier, receive a client query from a requestor, determine an active instance from the at least two instances based at least in part on comparing the first value of the switch parameter to the unique identifier of each instance, modify the client query at least in part based on the determined active instance to create a resultant query, execute the resultant query against the active instance to generate a resultant data, and provide the resultant data to the requestor.

In yet another aspect, a computer-readable storage media having computer-executable instructions embodied thereon is provided. When executed by at least one processor coupled to a memory device, the computer-executable instructions cause the processor to store a switch parameter having a first value in the memory device, store at least two instances of a data object in the memory device wherein each of the instances including a unique identifier, receive a client query from a requestor, determine an active instance from the at least two instances based at least in part on comparing the first value of the switch parameter to the unique identifier of each instance, modify the client query at least in part based on the determined active instance to create a resultant query, execute the resultant query against the active instance to generate a resultant data, and provide the resultant data to the requestor.

BRIEF DESCRIPTION OF THE DRAWINGS

FIG. 1 is a simplified block diagram of an example data management system that facilitates managing data access in accordance with one embodiment of the present disclosure.

FIG. 2 illustrates an example configuration of a client system shown in FIG. 1, in accordance with one embodiment of the present disclosure.

FIG. 3 illustrates an example configuration of the data management computer system shown in FIG. 1, in accordance with one embodiment of the present disclosure.

FIG. 4 is a schematic diagram of the example data management computer system for managing data access as shown in FIG. 1.

FIG. 5 is a process flowchart illustrating the process of switching from one database table to another database table for maintenance operations using the data management system shown in FIG. 1.

FIG. 6 shows an example configuration of the database within the data management computer system, along with other related computing components, that may be used to manage data access.

DETAILED DESCRIPTION OF THE DISCLOSURE

Figure 1:
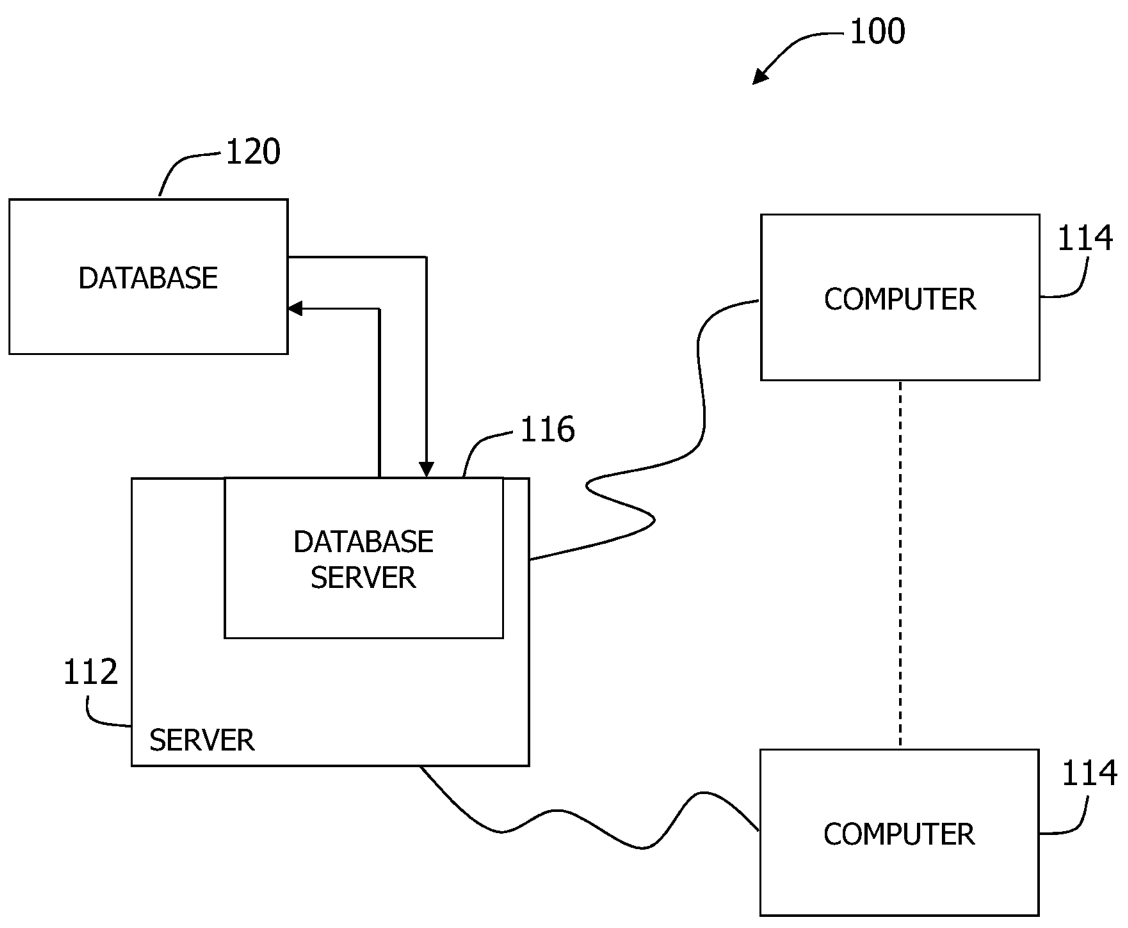
FIGS. 1-6 show example embodiments of the methods and systems described herein.

The following detailed description illustrates embodiments of the disclosure by way of example and not by way of limitation. It is contemplated that the disclosure has general application to managing and accessing data.

The systems and methods described herein relate to managing data access. More specifically, the systems and methods described herein relate to managing offline database access by maintaining continuous access to database information during maintenance operations that would otherwise require taking the database offline, such as during updates, data loading, and/or maintenance modifications.

In the example embodiment, a data management computer system includes a database that maintains two copies of the same database table, Table A and Table B. At t=0, Table A is active and Table B is inactive. When a client makes a query on the database at t=0, a view function, included within the data management computing system, determines which database table is active, in this case Table A. The view function modifies the query to access the active database table, Table A. The view function sends the results of the query back to the client. When the query from the client requests access to the database, neither the client nor query knows which database table will be accessed or that there are multiple database tables.

In the example embodiment, when an administrator wants to take the database offline to perform maintenance on it or update it, the data management computer system is configured to instruct the view function to de-activate Table A and activate Table B. In other words, the view function is configured to "switch" Table A and Table B such that at t=1, Table A is inactive; and Table B is active. In this situation, when queries come in from client systems at t=1, the queries are directed to Table B. While Table A is inactive, any necessary operations can be performed on it without causing an interruption in client usage. Clients can still access the data while Table A is being updated. When the administrator is finished with operations on Table A at t=2, the data management computer system instructs the view function to update the switch parameter, so that the system returns to the state that it was in at t=0, where Table A is active and Table B is inactive. At t=2, all client queries are directed to Table A. As Table B is inactive, it can be updated to match Table A.

The methods and systems described herein may be implemented using computer programming or engineering techniques including computer software, firmware, hardware, or any combination or subset wherein the technical effect is achieved by performing at least one of the following steps: (a) providing a data management computing device in communication with a database; (b) storing, in the database, a switch parameter having a first value; (c) storing, in the database, at least two instances of a data object, each instance including a unique identifier; (d) receiving a client query from a requestor; (e) determining, by the data management computing device, an active instance from the at least two instances based at least in part on comparing the first value of the switch parameter to the unique identifier of each instance and designating one of the at least two instances as the active instance when the first value of the switch parameter matches the unique identifier of the active instance, wherein the other instances are designated as inactive instances; (e) modifying, by the data management computing device, the client query at least in part based on the determined active instance to create a resultant query by activating a view function which is configured with the switch parameter to create the client query by creating at least a first sub-query, associated with a first instance, and a second sub-query, associated with a second instance, wherein each sub-query compares the associated unique identifier with the first value of the switch parameter, the first value determining from which instance of the at least two instances data is provided; (f) executing the resultant query against the active instance, thereby generating resultant data; (g) providing the resultant data to the requestor; and (h) performing one or more operations, which include at least one of updating, data loading, or maintenance, on at least one of the inactive instances of the at least two instances.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Washington). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

FIG. 1 is a simplified block diagram of an example data management system 100 that facilitates managing data access in accordance with one embodiment of the present disclosure. In this embodiment, system 100 facilitates managing access to data, as described herein. More specifically, system 100 includes a data management computer system 112 communicatively coupled to a plurality of client systems 114, also known as input devices.

In the example embodiment, client systems 114 are computers that include a web browser, which enables client systems 114 to access data management computer system 112 using the Internet. More specifically, client systems 114 are communicatively coupled to the Internet through many interfaces including, but not limited to, at least one of a network, such as the Internet, a local area network (LAN), a wide area network (WAN), an integrated services digital network (ISDN), a dial-up-connection, a digital subscriber line (DSL), a cellular phone connection, or a cable modem. Client systems 114 can be any device capable of accessing the Internet including, but not limited to, a desktop computer, a laptop computer, a personal digital assistant (PDA), a cellular phone, a smartphone, a tablet, or other web-based connectable equipment.

A database server 116 is communicatively coupled to a database 120 that stores data. In one embodiment, database 120 includes financial transaction data. For example, database 120 may be communicatively coupled to a payment network for processing payment card transactions. Thus, database 120 may be used to store transaction data associated with payment card transactions. In the example embodiment, database 120 is stored remotely from data management computer system 112. In some embodiments, database 120 is decentralized. In the example embodiment, a person can access database 120 via client systems 114 by logging onto data management computer system 112, as described herein.

In some embodiments, data management computer system 112 may be associated with a financial transaction interchange network, and may be referred to as an interchange computer system. Additionally, a check-out platform may be associated with the interchange network. Data management computer system 112 may be used for processing transaction data and for registering cardholders and/or merchants into a plurality of programs offered by the interchange network, including, but not limited to, an express check-out program. In addition, at least one of client systems 114 may include a computer system associated with an issuer of a transaction card. Accordingly, data management computer system 112 and client systems 114 may be utilized to process transaction data relating to purchases a cardholder makes utilizing a transaction card processed by the interchange network and issued by the associated issuer. Another client system 114 may be associated with a user or a cardholder seeking to register, access information, or process a transaction with at least one of the interchange network, the issuer, or the merchant.

Figure 2:
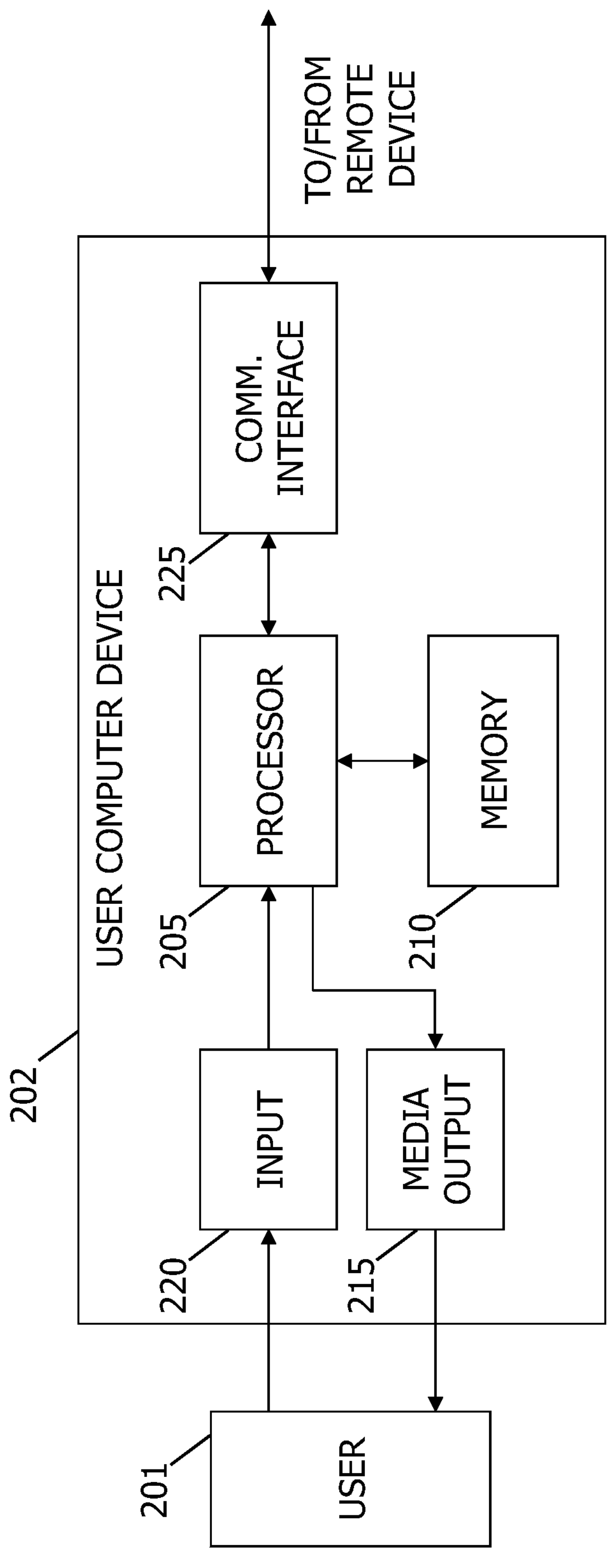

FIG. 2 illustrates an example configuration of a client system 114 shown in FIG. 1, in accordance with one embodiment of the present disclosure. User computer device 202 is operated by a user 201. User computer device 202 may include, but is not limited to, client systems 114 (shown in FIG. 1). User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively coupleable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information. In some embodiments, user computer device 202 includes an input device 220 for receiving input from user 201. User 201 may use input device 220 to, without limitation, select and/or enter one or more items to purchase and/or a purchase request, or to access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, a gesture detection device, and/or an audio input device. A single component such as a touch screen may function as both an output device of media output component 215 and input device 220.

User computer device 202 may also include a communication interface 225, communicatively coupled to a remote device such as data management computer system 112 (shown in FIG. 1). Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from data management computer system 112. A client application allows user 201 to interact with, for example, data management computer system 112. For example, instructions may be stored by a cloud service, and the output of the execution of the instructions sent to the media output component 215.

Figure 3:
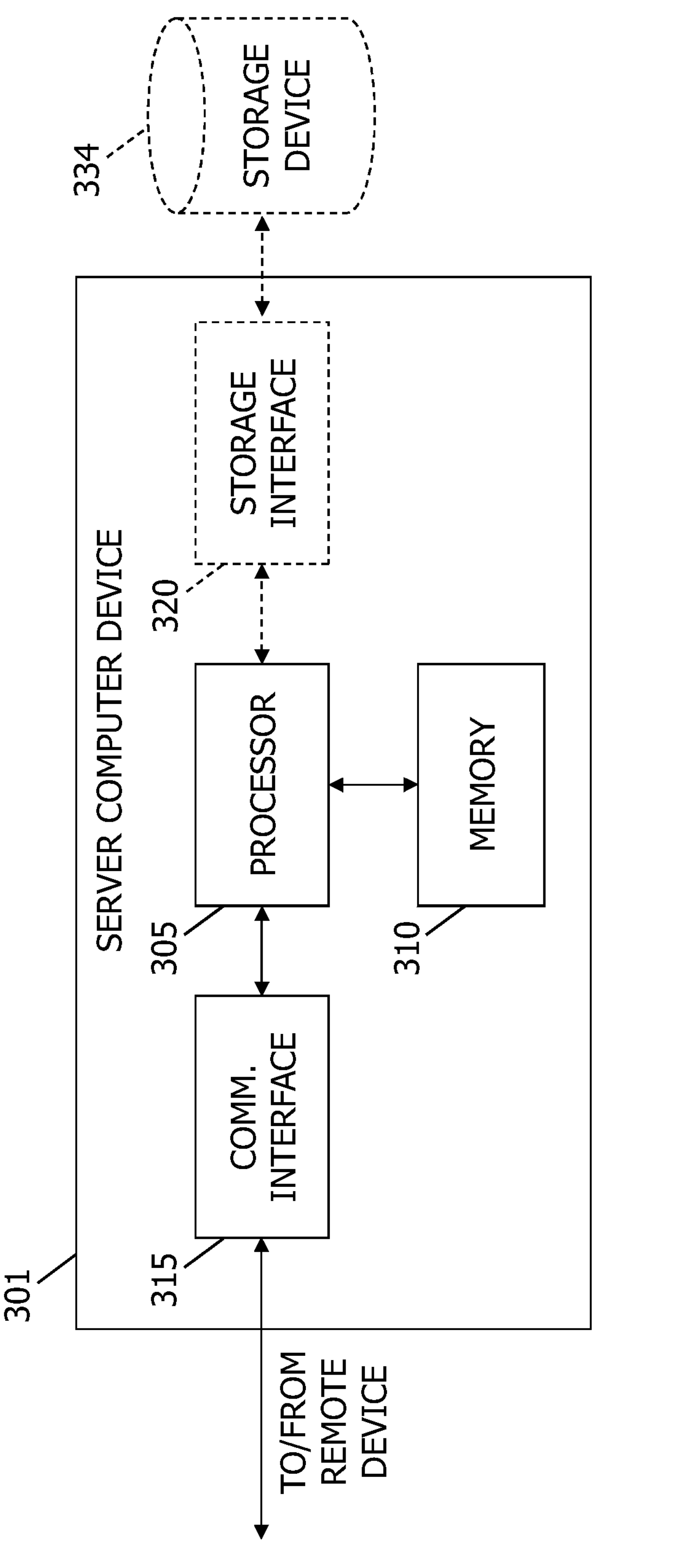

FIG. 3 illustrates an example configuration of the data management computer system 112 shown in FIG. 1, in accordance with one embodiment of the present disclosure. Server computer device 301 may include, but is not limited to, database server 116 (shown in FIG. 1). Server computer device 301 also includes a processor 305 for executing instructions. Instructions may be stored in a memory area 310. Processor 305 may include one or more processing units (e.g., in a multi-core configuration).

Processor 305 is operatively coupled to a communication interface 315 such that server computer device 301 is capable of communicating with a remote device such as client systems 114 or another server computer device 301. For example, communication interface 315 may receive requests from client systems 114 via the Internet, as illustrated in FIG. 1.

Processor 305 may also be operatively coupled to a storage device 334. Storage device 334 is any computer-operated hardware suitable for storing and/or retrieving data, such as, but not limited to, data associated with database 120 (shown in FIG. 1). In some embodiments, storage device 334 is integrated in server computer device 301. For example, server computer device 301 may include one or more hard disk drives as storage device 334. In other embodiments, storage device 334 is external to server computer device 301 and may be accessed by a plurality of server computer devices 301. For example, storage device 334 may include a storage area network (SAN), a network attached storage (NAS) system, and/or multiple storage units such as hard disks and/or solid state disks in a redundant array of inexpensive disks (RAID) configuration.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Figure 5:
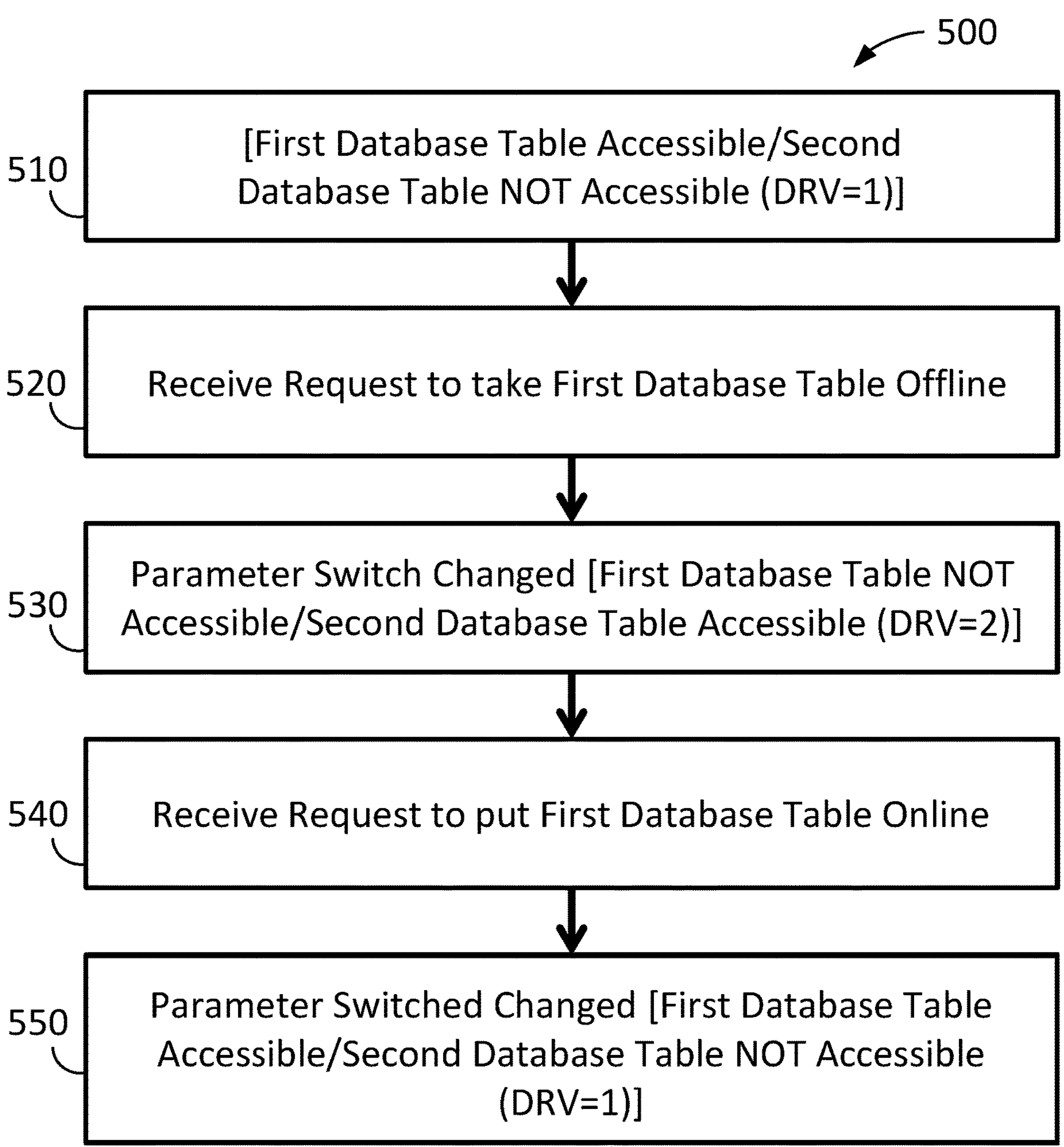

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 is programmed with the instruction such as illustrated in FIG. 5.

Figure 4:
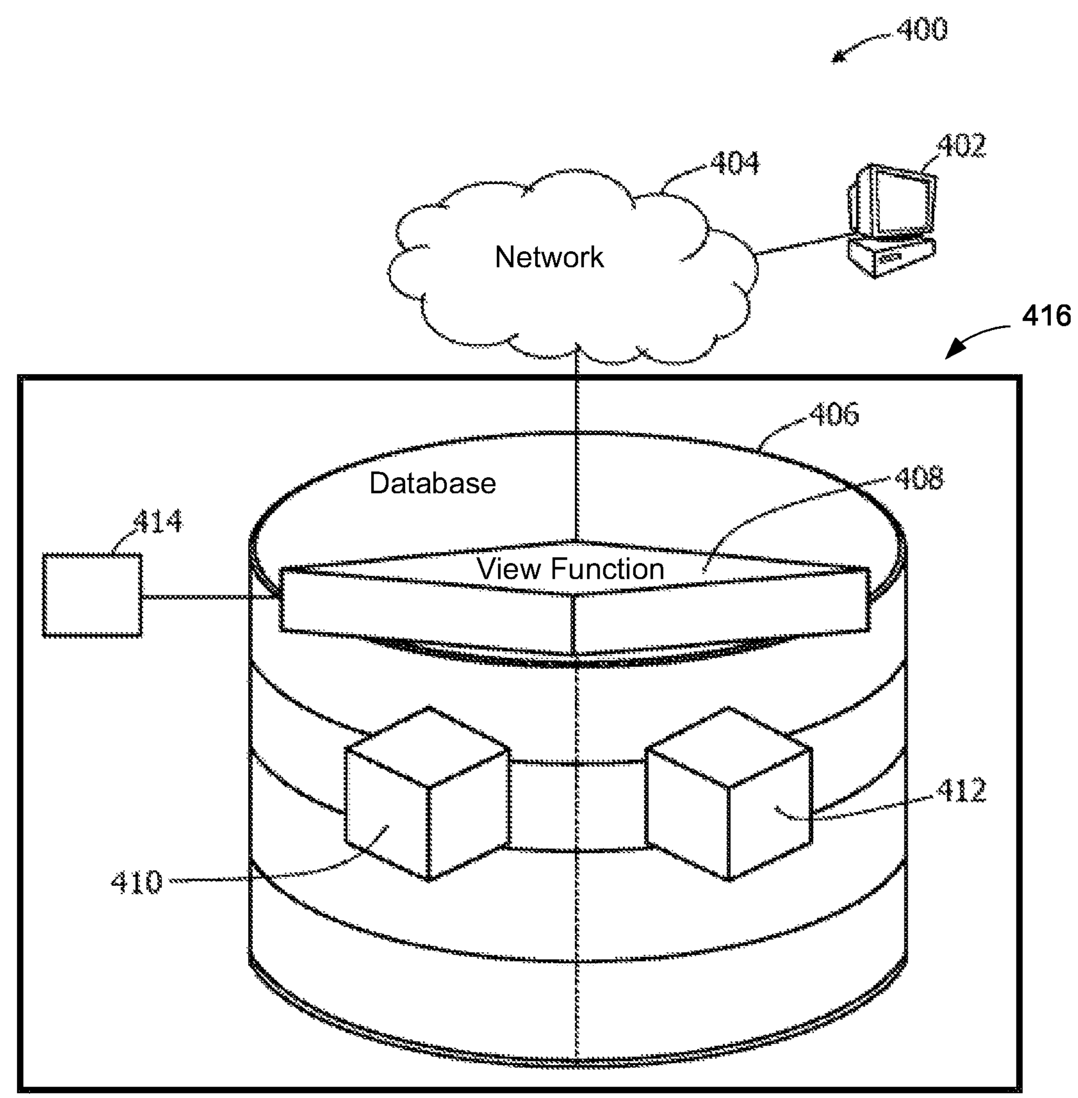

FIG. 4 is a schematic diagram of an example data management system 400 for managing data access that may be implemented using any of the mechanisms illustrated in FIGS. 1-3 as described herein. Data management system 400, which is similar to data management system 100 (shown in FIG. 1), includes a client system 402, such as client system 114, communicatively coupled to a data management computer system 416, such as data management computer system 112, through a network 404, such as the Internet. Client system 402 submits one or more queries to data management computer system 416 through network 404. Although only one client system 402 is shown, any number of client systems 402 may submit queries to data management computer system 416.

In an example embodiment, the data management computer system 416 contains database 406, such as database 120 and a "view" function 408 (i.e., a built-in function that modifies user queries). The database 406 includes a first database table 410 and a second database table 412, where the first database table 410 contains a current copy of the data. Although referred to herein as database tables, first and second database tables 410 and 412 may be any suitable data object including, but not limited to, a table, a materialized view, a view, and/or an external table. The view function 408 provides access to the first database table 410 and the second database table 412. The view function 408 is configured with a switch parameter 414 that controls whether incoming queries access the first or second database tables 410 and 412. The switch parameter 414 may be any suitable data object including, but not limited to, a variable, a table, a Boolean, and/or an array.

In one example embodiment, during normal operation, the first database table 410 contains the most current copy of data, and the view function 408 directs incoming queries to the first database table 410 based on the switch parameter 414. During a maintenance operation, the data management computer system 416 updates the second database table 412 with a copy of the current data from the first database table 410, and then sends a request to the view function 408 to take the first database table 410 offline. The view function 408 updates the switch parameter 414 to direct incoming queries to the second database table 412. The data management computer system 416 performs maintenance operations on the first database table 410 while the second database table 412 provides client systems 402 with access to the data. After completion of the maintenance operation, the data management computer system 416 sends a request to the view function 408 to put the first database table 410 back online. The view function 408 updates the switch parameter 414 to direct incoming queries back to the first database table 410.

The view function 408 enables redirection of incoming queries to the database 406 by pre-processing the incoming queries. More specifically, the view function 408 is configured to alter the original incoming query based on the switch parameter 414. The view function 408 creates a resultant query that defines a plurality of sub-queries, one for each of the database tables 410 and 412. The resultant query uses the switch parameter 414 to include output from only the "active" database table and exclude output from the other "inactive" database tables. More specifically, each sub-query will only return results if the switch parameter 414 is set to the value associated with that sub-query's database table.

View function 408 determines which of first and second database tables 410 and 412 is accessible from client system 402 by referencing the switch parameter ("sw") 414. View function 408 may also include additional parameters, such as a display function name parameter ("view name") and a display function owner parameter ("owner") associated with the switch parameter 414. For example, view function 408 may be created using the statement:

create table tbl_view_switch (owner varchar2(30), view name varchar2(30), sw number(2))

The following is an example code segment that may be used by view function 408 to determine which of first and second database tables 410 and 412 is accessible from client system 402:

```
CREATE OR REPLACE FORCE VIEW V3.W_ASSET_D
AS
  SELECT *
     FROM V1.W_ASSET_D
    WHERE EXISTS (SELECT sw FROM
tbl_view_switch WHERE owner =
'V3' and view_name = 'W_ASSET_D' and sw = 1)
  UNION ALL
  SELECT *
```

-continued

```
        FROM V2.W_ASSET_D
      WHERE EXISTS (SELECT sw FROM
tbl_view_switch WHERE owner =
'V3' and view_name = 'W_ASSET_D' and sw = 2)
```

where "W_ASSET_D" is a data object queried by client system 402, and first and second database tables 410 and 412 are both instances of W_ASSET_D. Using the code segment, when the switch parameter 414 is 1 (i.e., sw=1), display function 408 causes client system 402 to access first database table 410 ("V1.W_ASSET_D" in the above code segment). When the switch parameter 414 is 2 (i.e., sw=2), display function 408 causes client system 402 to access second database table 412 ("V2.W_ASSET_D" in the above code segment). As such, by referencing switch parameter 414, view function 408 acts as a switch between first and second database tables 410 and 412.

In an example embodiment, the data management computer system 416 determines that the first and second database tables 410 and 412 need to be updated. The data management computer system 416 instructs the view function 408 to set the switch parameter 414 to 2, such that all queries received by the view function 408 are processed using the second database table 412. With the switch parameter set to 2, first database table 410 can be updated (for example by dropping indices and then rebuilding the table). Once first database table 410 is updated, the data management computer system instructs the view function 408 to set the switch parameter 414 to 1, such that all queries received by the view function 408 are processed using now updated first database table 410. At this point, second database table 412 can be updated (e.g., by refreshing second database table 412 from a copy of the data now in second database table 410).

Accordingly, client system 402 can always access one of the first and second database tables 410 and 412, eliminating downtime and facilitating high-availability of the data in database 406. Further, from the perspective of client system 402, any updates to the database tables appear to be instantaneous. In the above embodiment, the client system 402 only sends a query to the database 406. The client system 402 does not know that there are multiple tables or need to designate which database table 410 or 412 the query is directed to. The view function 408 determines which database table 410 or 412 the query will access based on the switch parameter 414.

In another example embodiment, the data management computer system 416 is designed to allow the data to be completely accessible by maintaining a redundant copy of the data in one materialized view (i.e., a snapshot of a table at a point in time, or a combination of multiple tables) while the alternate materialized view is being refreshed. Once all of the materialized views for a schema (i.e., set of tables) are completely refreshed, the switch parameter 414 switches all data access for the data access views into the alternate set by a single update command against the switch parameter 414. From the client system's 402 perspective, only a single schema and fully consistent set of data is presented, even when the refresh for an entire schema takes several hours. This embodiment is more applicable to dealing with packaged applications.

An alternate embodiment may consist of a partitioned table where the database objects would be database partitions and the partitioning field would match the switch parameter 414. The view function 408 would then perform partition elimination to present a single set of data for all of the tables with in a single schema. This embodiment will be generally more useful when designed into a data loading system.

The following is an example code segment that may be used by view function 408 to determine which of the database partitions is accessible from client system 402:

```
TAB_A IS PARTITIONED ON
COLUMN ( PART_ID NUMBER )
CREATE OR REPLACE VIEW C
AS
SELECT M. * FROM TAB_A M, DRV_DATA
WHERE M.PART_ID = DRV_DATA.PART_ID ;
```

In this embodiment, switch parameter 414 would be PART_ID. For example, the table TAB_M could be partitioned with 7 distinct values. This would be utilized in a round robin fashion such that when PART_ID=7, the next PART_ID value would be 1. In this embodiment, the partitions could represent, but are not limited to, days of the week or months of the year.

In one embodiment, data management system 400 is implemented using an Oracle® database management system (Oracle is a registered trademark of Oracle International Corporation, Redwood City, California). Alternatively, system 400 may be implemented using framework that enables system 400 to function as described herein, such as, for example, modern Relational Database Management Systems (RDBMS), IBM® DB2 (IBM is a registered trademark of International Business Machines Corporation, Armonk, New York), and/or Microsoft® SQLserver (Microsoft is a registered trademark of Microsoft Corporation, Redmond, Washington).

FIG. 5 is a process flowchart 500 illustrating the process of switching from one database table to another database table for maintenance operations using the data management system 100 shown in FIG. 1. Under normal operation, the data management computer system 416 is at step 510, where the switch parameter 414 is set to 1, the first database table 410 is active, and the second database table 412 is inactive. When the data management computer system 416 receives a request to take the first database table 410 offline 520, then the data management computer system 416 instructs the view function to update 530 the switch parameter 414 to 2. In this state, the first database table 410 is inaccessible by client systems 402 as the view function 408 directs all queries to the second database table 412. During this state, the data management computer system 416 can update or refresh the first database table 410. When the data management computer system 416 receives a request to put the first database table 410 online 540, the data management computer system 416 instructs the view function 408 to update/change 550 the switch parameter 414 to 1. The first database table 410 is accessible and the second database table 412 is offline, which is the same state as Step 510.

Figure 6:
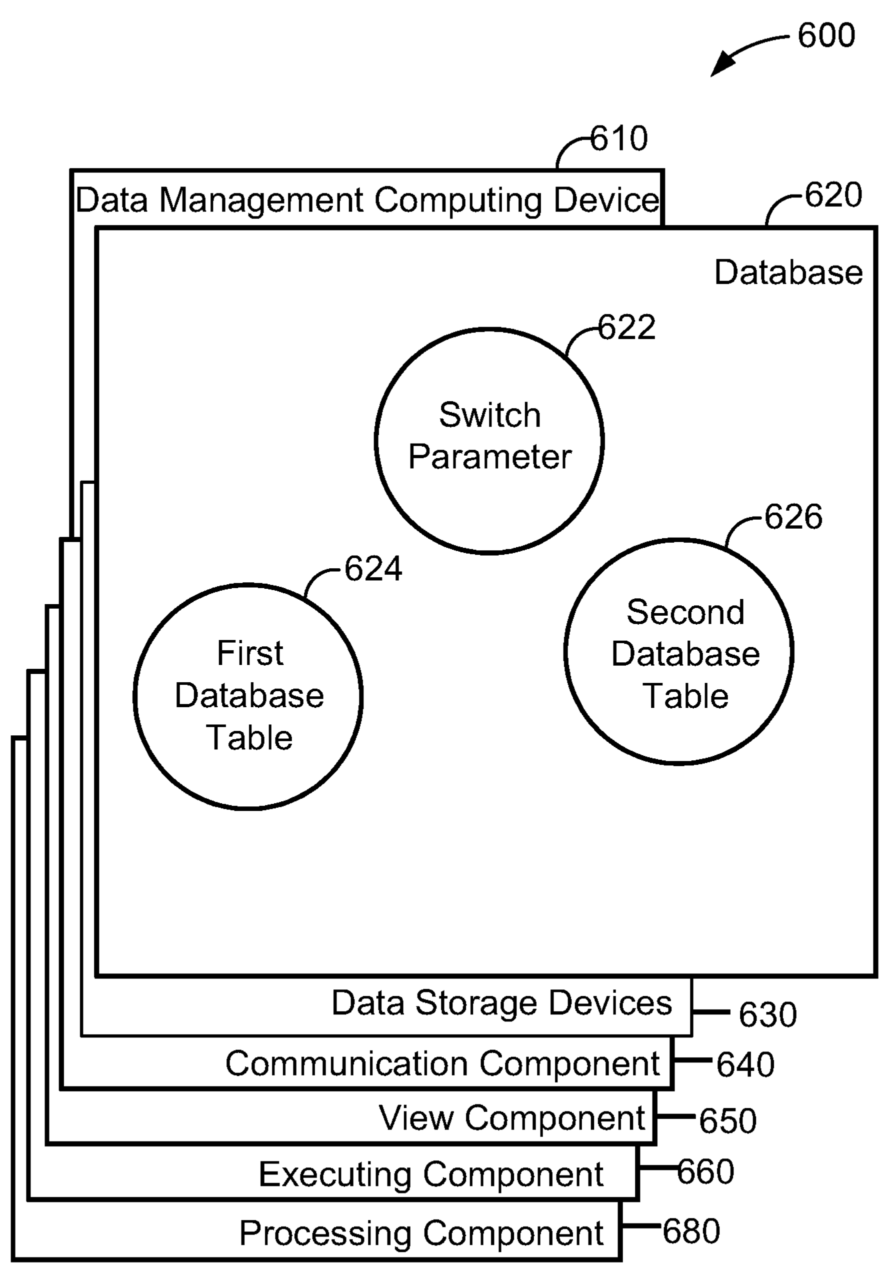

FIG. 6 shows an example configuration 600 of a database 620 within the data management computer system 416, along with other related computing components, that may be used to manage data access. Database 620 may be coupled to several separate components within computing device 610, which perform specific tasks.

In the example embodiment, database 620 includes switch parameter 622, first database table 624, and second database table 626. In some embodiments, database 620 is similar to database 120 (shown in FIG. 1), switch parameter 622 is similar to switch parameter 414 (shown in FIG. 4), first database table 624 is similar to first database table 410 (shown in FIG. 4), and second database table 626 is similar to second database table 412 (shown in FIG. 4).

Data management computing device 610 includes the database 620, as well as data storage devices 630. Data management computing device 610 also includes a communication component 640 for receiving client queries for the database 620 from client systems 114 (shown in FIG. 1) and providing the resultant data from the database 620 to client systems 114. Data management computing device 610 also includes a view component 650 for determining the active instance and modifying queries from client systems 114 to access the first database table 624 or the second database table 626. An executing component 660 is also included for executing the modified queries on the database 620. A processing component 680 assists with execution of computer-executable instructions associated with the database management system.

The systems and processes are not limited to the specific embodiments described herein. In addition, components of each system and each process can be practiced independent and separate from other components and processes described herein. Each component and process also can be used in combination with other assembly packages and processes.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

The above-described embodiments of methods and systems of managing offline database access provide an improved mechanism for providing access to data while updating and/or performing maintenance on the data. As a result, the methods and systems described herein facilitate high availability of the data.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for improving accessibility of data objects stored in an online database between computing devices by providing uninterrupted access to the data objects when the online database is undergoing maintenance operations when the data objects would be otherwise inaccessible, the online database including a view function and a plurality of data objects, the method using a computing device having at least one processor communicatively coupled to the online database, the method comprising:

storing, in the online database, the switch parameter and the data object, the switch parameter including a first unique identifier of the plurality of unique identifiers of the plurality of instances, the first unique identifier corresponding to a first instance of the data object, the first instance of the data object being the active instance and the other instances of the plurality of instances being the inactive instances;

receiving, by the view function associated with the switch parameter of the online database, a client query from a requestor, wherein the client query is directed to a data object of the plurality of data objects stored in the online database, the data object having a plurality of instances stored in the online database storing the data object, each of the plurality of instances of the data object (i) identified by a corresponding one of a plurality of unique identifiers and (ii) represented by a database table, wherein the switch parameter is a unique identifier indicative of a status of an instance of a data object of the plurality of data objects stored in the online database, wherein the status includes an active status or an inactive status when the data object of the online database is undergoing a maintenance operation;

modifying the received client query, by the view function, based on the switch parameter to create a resultant query defining a plurality of sub-queries each (i) including the switch parameter and (ii) directed to a corresponding one of the plurality of instances, each respective sub-query configured to return results only if the switch parameter matches one of the plurality of unique identifiers associated with the corresponding instance of the data object;

generating resultant data from the online database by executing the resultant query, the resultant data including output from the active instance of the data object and excluding output from the other instances of the plurality of instances of the data object, wherein the other instances are designated as inactive instances, wherein executing the resultant query includes comparing, by each sub-query, each unique identifier of each corresponding instance of the data object to the switch parameter, and wherein one or more operations are performed on at least one inactive instance of the other instances of the data object while the active instance of the data object provides access to data from the online database storing the plurality of data objects; and providing the resultant data to the requestor in response to the client query.

2. The method of claim 1 further comprising:

receiving, by the computing device, an update command including a second unique identifier of the plurality of unique identifiers, wherein the second unique identifier corresponds to a second instance of the data object; and updating, by the view function, the switch parameter to include the second unique identifier and exclude the first unique identifier, such that the first instance of the data object becomes one of the inactive instances of the data object, and the second instance of the data object becomes the active instance of the data object, wherein the resultant data generated in response to one of the sub-queries matching the second unique identifier of the active instance to the switch parameter.

3. The method of claim 1, wherein the view function is configured to modify client queries received from a client computing device associated with the requestor to access the active instance.

4. The method of claim 1 further comprising storing, in the online database, the plurality of unique identifiers.

5. The method of claim 1 further comprising performing at least one of updating, data loading, or maintenance on at least one inactive instance of the inactive instances.

6. The method of claim 1 further comprising separating the online database into at least two partitions, wherein each of the at least two partitions includes a unique identifier associated with each of the plurality of instances of the data object.

7. A computer system for improving accessibility of data objects stored in an online database between computing devices by providing uninterrupted access of the data objects when the online database is undergoing maintenance operations when the data objects would otherwise be inaccessible, the computer system comprising at least one processor communicatively coupled to a memory and in communication with the online database, the online database comprising a view function and a plurality of data objects, the at least one processor configured to:

storing, in the online database, a current switch parameter and the data object, the switch parameter including a first unique identifier of the plurality of unique identifiers of the plurality of instances, the first unique identifier corresponding to a first instance of the data object, the first instance of the data object being the active instance and the other instances of the plurality of instances being the inactive instances;

receive, by the view function associated with a switch parameter, a client query from a requestor, wherein the client query is directed to a data object of the plurality of data objects stored in the online database, the data object comprising a plurality of instances of the data object, each of the plurality of instances (i) identified by a corresponding one of a plurality of unique identifiers and (ii) represented by a database table, wherein the switch parameter is a unique identifier indicative of a status of an instance of a data object of the plurality of data objects stored in the online database, wherein the status includes an active status or an inactive status when the data object of the online database is undergoing a maintenance operation;

modify the received client query, by the view function, based on the switch parameter to create a resultant query defining a plurality of sub-queries each (i) including the switch parameter and (ii) directed to a corresponding one of the plurality of instances, each respective sub-query configured to return results only if the switch parameter matches one of the plurality of unique identifiers associated with the corresponding instance of the data object;

generate resultant data from the online database by executing the resultant query, the resultant data including output from the active instance of the data object and excluding output from the other instances of the plurality of instances of the data object, wherein the other instances are designated as inactive instances, wherein executing the resultant query comprises comparing, by each sub-query, each unique identifier of each corresponding instance of the data object to the switch parameter, and wherein one or more operations are performed on at least one inactive instance of the other instances of the data object while the active instance of the data object provides access to data from the online database storing the plurality of data objects; and provide the resultant data to the requestor in response to the client query.

8. The computer system of claim 7, wherein the at least one processor is further configured:

receive an update command including a second unique identifier of the plurality of unique identifiers, wherein the second unique identifier corresponds to a second instance of the data object; and update, by the view function, the switch parameter to include the second unique identifier and exclude the first unique identifier, such that the first instance of the data object becomes one of the inactive instances of the data object, and the second instance of the data object becomes the active instance of the data object, wherein the resultant data generated in response to one of the sub-queries matching the second unique identifier of the active instance to the switch parameter.

9. The computer system of claim 7, wherein the view function is configured to modify client queries received from a client computing device associated with the requestor to access the active instance.

10. The computer system of claim 7, wherein the at least one processor is further configured store, in the online database, the plurality of unique identifiers.

11. The computer system of claim 7, wherein the at least one processor is further configured perform at least one of updating, data loading, or maintenance on at least one inactive instance of the inactive instances.

12. The computer system of claim 7, wherein the at least one processor is further configured separate the online database into at least two partitions, wherein each of the at least two partitions includes a unique identifier associated with each of the plurality of instances of the data object.

13. At least one non-transitory computer-readable storage medium for improving accessibility of data objects stored in an online database between computing devices by providing uninterrupted access to the data objects when the online database is undergoing maintenance operations when the data objects would otherwise be inaccessible, the at least one non-transitory computer-readable storage medium having computer-executable instructions embodied thereon, the online database including a view function and a plurality of data objects, wherein, when executed by at least one processor coupled to an online database, the computer-executable instructions cause the at least one processor to:

store, in the online database, the switch parameter and the data object, the switch parameter including a first unique identifier of the plurality of unique identifiers of the plurality of instances, the first unique identifier corresponding to a first instance of the data object, the first instance of the data object being the active instance and the other instances of the plurality of instances being the inactive instances;

receive, by the view function associated with the switch parameter, a client query from a requestor, wherein the client query is directed to a data object of the plurality of data objects stored in the online database, the data object having a plurality of instances stored in the online database storing the data object, each of the plurality of instances of the data object (i) identified by a corresponding one of a plurality of unique identifiers and (ii) represented by a database table, wherein the switch parameter is a unique identifier indicative of a status of an instance of a data object of the plurality of data objects stored in the online database, wherein the status includes an active status or an inactive status when the data object of the online database is undergoing a maintenance operation;

modify the received client query, by the view function, based on the switch parameter to create a resultant query defining a plurality of sub-queries each (i) including the switch parameter and (ii) directed to a corresponding one of the plurality of instances, each respective sub-query configured to return results only if the switch parameter matches one of the plurality of unique identifiers associated with the corresponding instance of the data object;

generate resultant data from the online database by executing the resultant query, the resultant data including output from the active instance of the data object and excluding output from the other instances of the plurality of instances of the data object, wherein the other instances are designated as inactive instances, wherein executing the resultant query includes comparing, by each sub-query, each unique identifier of each corresponding instance of the data object to the switch parameter, and wherein one or more operations are performed on at least one inactive instance of the other instances of the data object while the active instance of the data object provides access to data from the online database storing the plurality of data objects; and provide the resultant data to the requestor in response to the client query.

14. The computer-readable storage medium of claim 13, wherein the view function is configured to modify client queries received from a client computing device associated with the requestor to access the active instance.

15. The computer-readable storage medium of claim 13, wherein the computer-executable instructions further cause the at least one processor to store, in the online database, the plurality of unique identifiers.

16. The computer-readable storage medium of claim 13, wherein the computer-executable instructions further cause the at least one processor to perform at least one of updating, data loading, or maintenance on at least one inactive instance of the inactive instances.

17. The computer-readable storage medium of claim 13, wherein the computer-executable instructions further cause the at least one processor to separate the online database into at least two partitions, wherein each of the at least two partitions includes a unique identifier associated with each of the plurality of instances of the data object.

* * * * *